Patented Dec. 15, 1942

2,305,401

UNITED STATES PATENT OFFICE 2,305,401

EXTREME PRESSURE LUBRICANT

Bradshaw F. Armendt, Baytown, Tex., assignor to Standard Oil Development Company, a corporation of Delaware No Drawing. Application September 14, 1940, Serial No. 356,859

6 Claims. (Cl. 252—48)

This invention deals with the production and use of sulfur-containing compositions suitable for lubrication of moving parts especially when under severe conditions such as those encountered with heavy loads as well as those usually involved in hypoid gears and similar equipment.

In the acid treatment of cracked naphthas and similar operations, a sludge is formed which separates as a bottom layer, and this is drawn off and generally possesses little commercial value. In the Showalter and Wiggen application, Serial No. 293,050 filed on September 1, 1939, a process has been described for preparing oily products from these sludges suitable as synthetic drying oils and as raw materials for other uses. In short, the process involved consists of hydrolyzing the sludge, preferably naphtha sludge, with steam or hot water so as to recover a weak sulfuric acid and an oily layer which is formed as a result of the chemical reactions taking place during the hydrolysis operation. This oily layer is a viscous material which may be treated with propane or similar precipitant to precipitate out tarry constituents, coke, etc., and the unprecipitated oil free of these asphaltic impurities is distilled to remove the propane (or other precipitant) and further distilled to give an overhead oil which is employed as the source material in the present invention. This oil will hereafter be designated as "hydrolyzed sludge oil."

A purpose of the present invention is to convert this hydrolyzed sludge oil into a more useful and suitable material for the lubrication industry. A further object is to produce from said oil a substantially non-volatile highly potent and cheap extreme pressure lubricant which is comparable to and in many respects superior to other extreme pressure lubricating materials prepared from much more expensive raw materials.

Due to the highly unsaturated nature of the oil, it might be expected that sulfurization would produce a cokey, insoluble mass or a product which would have drying properties making the material unsuitable for lubricating purposes. Contrary to these expectations, however, by suitable control of the reaction conditions, it has been possible to obtain high yields of excellent extreme pressure lubricant base from this raw material.

One method for producing such a base consists in chlorinating the hydrolyzed sludge oil or its distillates in presence of a solvent such as carbon tetrachloride and at temperatures in the neighborhood of 0° F., more or less, until the oil has absorbed about 10–30% by weight of chlorine. This chlorinated product is then reacted with a reactive sulfur compound such as n-butyl mercaptide, sodium polysulfide, sodium hydrosulfide, or mixtures thereof by refluxing in presence of a solvent such as secondary amyl alcohol, isopropyl alcohol, etc., for a period of 4–12 hours. By such treatment, sodium chloride or equivalent material is precipitated out of the reaction mixture and may be filtered off, leaving the desired sulfur-containing base which may be recovered by ordinary or vacuum distillation. To obtain a pure product, it is generally desirable to wash this oily sulfur-containing base with alkali in benzene or similar solvent solution. By controlling the amount of reactive sulfur compound, it is possible to obtain a product which contains a major proportion or a minor proportion of chlorine or even a material substantially free of chlorine or equivalent halogen. Such a base thus prepared generally contains over 2% sulfur and, when added to a lubricating oil in a concentration of ½ to 20%, more or less, produces an extreme pressure lubricant having exceptional properties and capable of passing corrosion, neutralization and similar critical tests.

Another method for producing a highly suitable extreme pressure base is to heat the hydrolyzed sludge oil with elementary sulfur (2–20% by weight) for ½ to 4 hours at 200–400° F. Contrary to what might be expected, an unusually clear, viscous, reddish, sulfurized oil is obtained containing sulfur in the neighborhood of 2–10% and perfectly soluble in paraffinic and other mineral lubricating oils. Such an oil possesses not only load carrying properties but also corrosion inhibiting and antioxidant properties and also passes the rigorous tests imposed upon lubricants of this character.

The invention can be more readily understood by the following examples which, however, are not intended to limit the invention in any manner:

*Example I.*—A sample of hydrolyzed sludge oil obtained from treating cracked naphtha with strong sulfuric acid, and processing according to the method described above, was mixed with an equivalent amount of carbon tetrachloride, and chlorine was bubbled through the mixture at 0° F. until the oil had adsorbed 20% by weight of chlorine. A 100 gm. sample of this chlorinated oil (containing about 1.21% sulfur) was then mixed with 100 gms. of sodium n-butyl mercaptide dissolved in 1 liter of secondary amyl alcohol and the resultant mixture was refluxed for about 8 hours. After filtering off the salt, the sulfurized reaction product was segregated from the alcohol and the unreacted constituents by vacuum distillation. This product contained 9.15% sulfur after having been caustic washed and water washed in benzene solution.

The sulfurized product thus formed was blended in concentrations of 0.5 and 3% in a phenol extracted and dewaxed Coastal lubricating oil and inspections were made on the resulting blends with the following results:

|  | Sulfurized oil added | | |
|---|---|---|---|
|  | Blank, 0% | 0.5% | 3% |
| Viscosity at 100° F., S. U. S | 1170 | 1146 | 1025 |
| Viscosity at 210° F., S. U. S | 84.7 | 84.5 | 80.2 |
| Viscosity index | 70 | 72 | 73 |
| Pour point, °F | 0 | 0 | −10 |
| Army specification emulsion test | Trace | Trace | Pass |
| Oxidation rate (oxygen absorption cc. per 15 min. intervals at 250° C.) | 20, 27, 30, 29 | 18, 19, 17, 17 | 19, 15, 15, 13 |
| Viscosity at 210° F. after oxidation in Indiana test | 99 | 106 | 99 |
| Sulfur, per cent | 0.2 | 0.24 | 0.5 |
| Corrosion | | Pass | |
| Neutralization number | 0.02 | 0.02 | 0.03 |
| Color, Tag. Robinson | 8½ | 9+ | 7¼ |
| Colorhold 16 hrs. at 250° F. Tag. Robinson | 5½ | 4 | 2½ |

From the above data, it can be readily seen that the sulfurized oil base does not detrimentally affect the viscosity characteristics, and in fact, in concentrations of 2–5%, distinctly lowers the pour point of the oil. Furthermore, the base exhibits antioxidant properties and yet does not prevent the blend from passing corrosion, neutralization and other tests.

*Example II.*—A sample of hydrolyzed sludge oil obtained from cracked gasoline sludge was mixed with 10% by weight of elementary sulfur and heated for 1½ hours at 290–300° F. After this treatment, the sulfur was found to be completely reacted with the oil, forming a clear, viscous product of dark red color. This sulfurized material was found to contain 8.42% sulfur by analysis and was perfectly soluble in a paraffinic mineral oil.

Almen test data showed that a 10% blend of this sulfurized product in a Pennsylvania lubricating oil of 40 vis. Saybolt at 210° F. was capable of carrying a full load of 15 weights gradual loading and 5–7 weights shock loading upon this machine. The blend had a flash point of 355° F.

*Example III.*—A sample of sulfurized base prepared in a manner similar to that described under Example I was blended in 10% concentration in a mineral gear oil having a viscosity of 90 secs. Saybolt at 210° F. A blend containing 10% of this base and 8% chlorinated paraffin wax of 40% chlorine content was also prepared and compared with a blend of the gear oil containing only 8% chlorinated wax:

|  | 100% mineral oil | 10% sulfurized hydrolyzed sludge oil in mineral lubricating oil | 8% chlorinated wax in mineral lubricating oil | 10% sulfurized hydrolyzed sludge oil and 8% chlorinated wax in mineral oil |
|---|---|---|---|---|
| S. A. E. machine (1000 R. P. M., 14.6/1 rubbing ratio) | 15/25 | [1] 70 | [1] 100 | [1] 320 |
| Almen machine: Gradual loading | [2] 3 | [2] 3 | [2] 8/10 | [2] 15 |
| Shock loading | | | | [2] 13 |
| Copper strip | ([3]) | ([3]) | ([3]) | ([3]) |

[1] Pounds.
[2] Weights.
[3] Passes.

It will be observed that the blend containing the sulfurized hydrolyzed sludge oil showed considerable load improvement, especially in the S. A. E. machine and in the Almen machine when employed in conjunction with chlorinated paraffin wax.

These sulfurized products may be employed in greases, motor oils, textile oils, industrial oils, ink oils, and other lubricating and process compositions either alone or in conjunction with various types of lubricating and light and heavy mineral or fatty oils with or without other addition agents such as dyes, pour inhibitors, V. I. improvers, soaps, antioxidants, oiliness agents, sludge dispersers, and the like. They may be also added to Diesel fuel oils and similar compositions. Although sulfur is preferred, other elements of the sulfur group, such as selenium and tellurium may be employed in the preparation of these compositions.

I claim:

1. Process for the production of a sulfurized product comprising hydrolyzing a naphtha acid sludge to obtain an oily layer and an aqueous layer, recovering the oily layer, chlorinating said oily layer to a chlorine content of about 10–30% by weight, reacting said chlorinated product with a reactive sulfur compound, and recovering the resulting sulfur-containing condensation product.

2. Process for the preparation of a blending agent for a mineral lubricating oil to impart to the composite extreme pressure lubricating characteristics which comprises hydrolyzing cracked naphtha acid sludge with water at an elevated temperature, separating the aqueous layer thus formed, treating the residual oil material with propane, settling, separating the thus clarified oil, heating said clarified oil to remove propane, distilling the resultant oil, chlorinating the distillate material to a chlorine content of 10 to 30% by weight, reacting said chlorinated product with a reactive sulfur compound, and recovering the resultant sulfur-containing condensation product.

3. Process according to claim 2 in which the reactive sulfur compound is sodium n-butyl mercaptide.

4. Process according to claim 2 in which the reactive sulfur compound is sodium polysulfide.

5. Process according to claim 2 in which the reactive sulfur compound is sodium hydrosulfide.

6. Process for the preparation of a blending agent for a mineral lubricating oil to impart to the composite extreme pressure lubricating characteristics which comprises hydrolyzing cracked naphtha acid sludge with steam, separating the aqueous layer thus formed, treating the residual oil material with propane, settling, separating the thus clarified oil, heating the said clarified oil to remove propane, distilling the resultant oil, treating the distillate material with chlorine in the presence of carbon tetrachloride as a solvent to a chlorine content of about 20% by weight, reacting the resultant chlorinated product with sodium n-butyl mercaptide dissolved in secondary amyl alcohol, and recovering the resultant sulfur-containing condensation product.

BRADSHAW F. ARMENDT.